(12) United States Patent
Atsumi et al.

(10) Patent No.: US 9,012,805 B2
(45) Date of Patent: Apr. 21, 2015

(54) LASER WORKING METHOD

(75) Inventors: Kazuhiro Atsumi, Hamamatsu (JP);
Koji Kuno, Hamamatsu (JP); Tatsuya Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1223 days.

(21) Appl. No.: 12/444,119

(22) PCT Filed: Sep. 26, 2007

(86) PCT No.: PCT/JP2007/068657
§ 371 (c)(1),
(2), (4) Date: May 7, 2009

(87) PCT Pub. No.: WO2008/041579
PCT Pub. Date: Apr. 10, 2008

(65) Prior Publication Data
US 2010/0006548 A1    Jan. 14, 2010

(30) Foreign Application Priority Data

Oct. 3, 2006  (JP) ................................ P2006-271981

(51) Int. Cl.
*B23K 26/00* (2014.01)
*B23K 26/04* (2014.01)
*B23K 26/40* (2014.01)

(52) U.S. Cl.
CPC ........... *B23K 26/046* (2013.01); *B23K 26/4075* (2013.01); *B23K 26/0057* (2013.01); *B23K 26/048* (2013.01)

(58) Field of Classification Search
USPC .............................. 219/121.72, 121.75, 121.6
See application file for complete search history.

(56) References Cited

U.S. PATENT DOCUMENTS 4,546,231 A    10/1985  Gresser et al.
5,999,266 A *  12/1999  Takahashi et al. ............ 356/613
(Continued)

FOREIGN PATENT DOCUMENTS

CN    1160228 A    9/1997
CN    1720117      1/2006
(Continued)

OTHER PUBLICATIONS

U.S. Appl. No. 13/206,181, filed Aug. 9, 2011.
(Continued)

*Primary Examiner* — Henry Yuen
*Assistant Examiner* — Ayub Maye
(74) *Attorney, Agent, or Firm* — Drinker Biddle & Reath LLP

(57) ABSTRACT

A converging point of processing laser light is made to accurately follow a laser light irradiation surface of an object to be processed. An object to be processed 1 is irradiated with measuring laser light along a line to cut 5, astigmatism is added to a reflected light component of the measuring laser light reflected by a front face 3 of the object 1 irradiated with the measuring laser light, a displacement sensor signal corresponding to a converged light image of the reflected light component having the astigmatism added thereto is detected, and the displacement sensor signal is made to become a feedback reference value corresponding to the quantity of the reflected light component, so as to locate the converging point of the processing laser light at a predetermined position with respect to the front face 3. This allows tire converging point of the processing laser light to follow the front face 3 of the object 1 reliably and accurately even when an area exhibiting an extremely low reflectance to the measuring laser light exists in a part of the front face 3 and lowers the quantity of the reflected light component of the measuring laser light.

15 Claims, 19 Drawing Sheets

(56) References Cited

U.S. PATENT DOCUMENTS

| | | |
|---|---|---|
| 6,992,026 B2 | 1/2006 | Fukuyo et al. |
| 7,396,742 B2 | 7/2008 | Fukuyo et al. |
| 7,489,454 B2 | 2/2009 | Fukuyo et al. |
| 7,547,613 B2 | 6/2009 | Fukuyo et al. |
| 7,566,635 B2 | 7/2009 | Fujii et al. |
| 7,592,237 B2 | 9/2009 | Sakamoto et al. |
| 7,592,238 B2 | 9/2009 | Fukuyo et al. |
| 7,595,895 B2* | 9/2009 | Kurita et al. ............... 356/614 |
| 7,605,344 B2 | 10/2009 | Fukumitsu |
| 7,608,214 B2 | 10/2009 | Kuno et al. |
| 7,615,721 B2 | 11/2009 | Fukuyo et al. |
| 7,626,137 B2 | 12/2009 | Fukuyo et al. |
| 7,709,767 B2 | 5/2010 | Sakamoto |
| 7,718,510 B2 | 5/2010 | Sakamoto et al. |
| 7,719,017 B2 | 5/2010 | Tanaka |
| 7,732,730 B2 | 6/2010 | Fukuyo et al. |
| 7,749,867 B2 | 7/2010 | Fukuyo et al. |
| 7,754,583 B2 | 7/2010 | Sakamoto |
| 7,825,350 B2 | 11/2010 | Fukuyo et al. |
| 7,897,487 B2 | 3/2011 | Sugiura et al. |
| 7,902,636 B2 | 3/2011 | Sugiura et al. |
| 7,939,430 B2 | 5/2011 | Sakamoto et al. |
| 7,947,574 B2 | 5/2011 | Sakamoto et al. |
| 2005/0202596 A1 | 9/2005 | Fukuyo et al. |
| 2005/0272223 A1 | 12/2005 | Fujii et al. |
| 2006/0144828 A1* | 7/2006 | Fukumitsu et al. ...... 219/121.67 |
| 2006/0148212 A1 | 7/2006 | Fukuyo et al. |
| 2006/0255024 A1 | 11/2006 | Fukuyo et al. |
| 2007/0085099 A1 | 4/2007 | Fukumitsu et al. |
| 2007/0125757 A1 | 6/2007 | Fukuyo et al. |
| 2007/0158314 A1 | 7/2007 | Fukumitsu et al. |
| 2007/0252154 A1 | 11/2007 | Uchiyama et al. |
| 2008/0035611 A1 | 2/2008 | Kuno et al. |
| 2008/0037003 A1 | 2/2008 | Atsumi et al. |
| 2008/0090382 A1 | 4/2008 | Fujii et al. |
| 2008/0218735 A1 | 9/2008 | Atsumi et al. |
| 2008/0251506 A1 | 10/2008 | Atsumi et al. |
| 2009/0008373 A1 | 1/2009 | Muramatsu et al. |
| 2009/0032509 A1 | 2/2009 | Kuno et al. |
| 2009/0098713 A1 | 4/2009 | Sakamoto |
| 2009/0107967 A1 | 4/2009 | Sakamoto et al. |
| 2009/0117712 A1 | 5/2009 | Sakamoto et al. |
| 2009/0166342 A1 | 7/2009 | Kuno et al. |
| 2009/0166808 A1 | 7/2009 | Sakamoto et al. |
| 2009/0250446 A1 | 10/2009 | Sakamoto |
| 2009/0261083 A1 | 10/2009 | Osajima et al. |
| 2009/0302428 A1 | 12/2009 | Sakamoto et al. |
| 2010/0009547 A1 | 1/2010 | Sakamoto |
| 2010/0012632 A1 | 1/2010 | Sakamoto |
| 2010/0012633 A1 | 1/2010 | Atsumi et al. |
| 2010/0015783 A1 | 1/2010 | Fukuyo et al. |
| 2010/0025386 A1 | 2/2010 | Kuno et al. |
| 2010/0032418 A1 | 2/2010 | Kuno et al. |
| 2010/0055876 A1 | 3/2010 | Fukuyo et al. |
| 2010/0151202 A1 | 6/2010 | Fukumitsu |
| 2010/0176100 A1 | 7/2010 | Fukuyo et al. |
| 2010/0184271 A1 | 7/2010 | Sugiura et al. |
| 2010/0200550 A1 | 8/2010 | Kumagai |
| 2010/0203678 A1 | 8/2010 | Fukumitsu et al. |
| 2010/0203707 A1 | 8/2010 | Fujii et al. |
| 2010/0227453 A1 | 9/2010 | Sakamoto |
| 2010/0240159 A1 | 9/2010 | Kumagai et al. |
| 2010/0258539 A1 | 10/2010 | Sakamoto |
| 2010/0301521 A1 | 12/2010 | Uchiyama |
| 2010/0311313 A1 | 12/2010 | Uchiyama |
| 2010/0327416 A1 | 12/2010 | Fukumitsu |
| 2011/0000897 A1 | 1/2011 | Nakano et al. |
| 2011/0001220 A1 | 1/2011 | Sugiura et al. |
| 2011/0021004 A1 | 1/2011 | Fukuyo et al. |
| 2011/0027971 A1 | 2/2011 | Fukuyo et al. |
| 2011/0027972 A1 | 2/2011 | Fukuyo et al. |
| 2011/0037149 A1 | 2/2011 | Fukuyo et al. |
| 2011/0274128 A1 | 11/2011 | Fukumitsu et al. |

FOREIGN PATENT DOCUMENTS

| | | |
|---|---|---|
| EP | 1 712 322 | 10/2006 |
| EP | 1 716 961 | 11/2006 |
| JP | S63-149513 | 6/1988 |
| JP | 2005-150537 | 6/2005 |
| JP | 2005-193285 | 7/2005 |
| JP | 2005-199285 | 7/2005 |
| JP | 2006-074025 | 3/2006 |
| JP | 2006-114627 | 4/2006 |
| KR | 10-2005-0083969 | 8/2005 |

OTHER PUBLICATIONS

U.S. Appl. No. 13/269,274, filed Oct. 7, 2011.
U.S. Appl. No. 13/235,936, filed Sep. 19, 2011.
U.S. Appl. No. 13/213,175, filed Aug. 19, 2011.
U.S. Appl. No. 13/233,662, filed Sep. 15, 2011.
U.S. Appl. No. 13/061,438, filed Apr. 26, 2011.
U.S. Appl. No. 13/107,056, filed May 13, 2011.
U.S. Appl. No. 13/151,877, filed Jun. 2, 2011.
U.S. Appl. No. 13/131,429, filed Jun. 28, 2011.
U.S. Appl. No. 13/143,636, filed Sep. 21, 2011.
U.S. Appl. No. 13/148,097, filed Aug. 26, 2011.
U.S. Appl. No. 13/262,995, filed Oct. 5, 2011.
U.S. Appl. No. 13/265,027, filed Oct. 18, 2011.
X. Liu et al., "Laser Ablation and Micromachining with Ultrashort Laser Pulses," IEEE Journal of Quantum Electronics, vol. 33, No. 10, Oct. 1997, pp. 1706-1716.
K. Hayashi, "Inner Glass Marking by Harmonics of Solid State Laser," Proceedings of the 45$^{th}$ Laser Materials Processing Conference, R&D Center Sumitomo Heavy Industries, Ltd., Dec. 1998, pp. 23-28, with English abstract.
K. Miura et al., "Formation of Photo-induced Structures in Glasses with Femtosecond Laser," Proceedings of the 42$^{nd}$ Laser Materials Processing Conference, Nov. 1997, pp. 105-111, with English abstract.
T. Sano et al., "Ultrashort Pulse Laser Microprocessing of Silicon," Preprints of the National Meetings of Japan Welding Society, vol. 66, Apr. 2000, pp. 72-73, with English language translation.

* cited by examiner

LASER WORKING METHOD

TECHNICAL FIELD

The present invention relates to a laser processing method for cutting a planar object to be processed along a line to cut.

BACKGROUND ART

Known as a conventional laser processing method is one which irradiates a planar object to be processed with processing laser light while locating a converging point within the object, so as to form a modified region to become a cutting start point within the object along a line to cut the object (see, for example, Patent Literature 1).
Patent Literature 1: Japanese Patent Application Laid-Open No. 2005-150537

DISCLOSURE OF INVENTION

Technical Problem

It is typical for laser processing methods such as the one mentioned above to irradiate the object with measuring laser light along a line to cut, add astigmatism to a reflected light component of the measuring laser light reflected by a laser light irradiation surface of the object, detect a detection value corresponding to a converged light image of the reflected light component having the astigmatism added thereto, and make the detection value constant, thereby causing the converging point of the processing laser light to follow the laser light irradiation surface. When an area exhibiting an extremely low reflectance to the measuring laser light exists in a part of the laser light irradiation surface, however, an error may occur in the detection value in this area, whereby the converging point of the processing laser light may fail to accurately follow the laser light irradiation surface in such a laser processing method.

It is therefore an object of the present invention to provide a laser processing method which allows a converging point of processing laser light to accurately follow a laser light irradiation surface of an object to be processed.

Solution to Problem

For achieving the above-mentioned object the laser processing method in accordance with the present invention is a laser processing method of irradiating a planar object to be processed with processing laser light while locating a converging point within the object so as to form a modified region to become a cutting start point within the object along a line to cut the object; the method comprising irradiating the object with measuring laser light along the line to cut, adding astigmatism to a reflected light component of the measuring laser light reflected by a laser irradiation surface irradiated with the measuring laser light in the object, detecting a detection value corresponding to a converged light image of the reflected light component having the astigmatism added thereto, and making the detection value become a predetermined value corresponding to a quantity of the reflected light component, so as to locate the converging point of the processing laser light at a predetermined position with respect to the laser light irradiation surface.

This laser processing method makes the detection value acquired by irradiation with the measuring laser light become a predetermined value corresponding to the quantity of the reflected light component of the measuring laser light, thereby locating the converging point of the processing laser light at a predetermined position from the laser light irradiation surface. Therefore, the converging point of the processing laser light can accurately follow the laser light irradiation surface of the object even when an area exhibiting an extremely low reflectance to the measuring laser light exists in a part of the laser light irradiation surface and lowers the quantity of the reflected light component of the measuring laser light, for example.

Preferably, a relationship between the detection value and light quantity is acquired beforehand in a state where a converging point of the measuring laser light is positioned at a predetermined distance from the laser light irradiation surface, and the detection value is made to become the predetermined value corresponding to the quantity of the reflected light component according the relationship, so as to locate the converging point of the processing laser light at the predetermined position from the laser light irradiation surface. This can easily and reliably make the detection value attain the predetermined value corresponding to the quantity of the reflected light component of the measuring laser light.

There is a case where the object has a semiconductor substrate, while the modified region includes a molten processed region.

Preferably, the method further comprises the step of cutting the object along the line to cut from the modified region acting as a cutting start point. This can accurately cut the object along the line to cut.

Preferably, a total light quantity value corresponding to a total quantity of the reflected light component is detected along the line to cut while detecting the detection value; when the total light quantity value is a threshold value or higher, a lens for converging the laser light is moved along an optical axis thereof such that the detection value becomes a predetermined first reference value, so as to acquire a first control value for controlling the movement of the lens; when the total light quantity value is less than the threshold, the detection value and the total light quantity value are detected again at a position where the total light quantity value of less than the threshold is detected, so as to acquire a relationship between the redetected detection value and the total light quantity value; the object is irradiated with the measuring laser light again along the line to cut, so as to detect the detection value and the total light quantity value again; and the lens is moved along the optical axis thereof such that the detection value becomes the first reference value at a position where the total light quantity value of the threshold value or higher is detected, and the lens is moved along the optical axis thereof such that the detection value becomes a second reference value calculated from the total light quantity value and the relationship so as to acquire a second control value for controlling the movement of the lens at a position where the total light quantity value of less than the threshold is detected.

Preferably, while locating the converging point at the predetermined position with respect to the laser light irradiation surface by moving the lens according the fist or second control value, the object is irradiated with the processing laser light.

Advantageous Effects of Invention

The converging point of processing laser light can accurately follow a laser light irradiation surface of an object to be processed.

REFERENCE SIGNS LIST

1 . . . object to be processed; 3 . . . front face (laser light entrance surface); 5 . . . line to cut; L . . . laser light; P . . . converging point

DESCRIPTION OF EMBODIMENTS

In the following, a preferred embodiment of the present invention will be explained in detail with reference to the drawings. In the laser processing method in accordance with the embodiment, a phenomenon known as multiphoton absorption is used for forming a modified region within an object to be processed. Therefore, to begin with, a laser processing method for forming a modified region by the multiphoton absorption will be explained.

A material becomes transparent when its absorption bandgap $E_G$ is greater than photon energy hv. Consequently, a condition under which absorption occurs in the material is hv>$E_G$. However, even when optically transparent, the material generates absorption under a condition of nhv>$E_G$ (where n=2, 3, 4,...) if the intensity of laser light becomes very high. This phenomenon is known as multiphoton absorption. In the case of pulsed waves, the intensity of laser light is determined by the peak power density (W/cm$^2$) of laser light at its converging point. The multiphoton absorption occurs under a condition where the peak power density is 1×10$^8$ (W/cm$^2$) or greater, for example. The peak power density is determined by (energy of laser light at the converging point per pulse)/(beam spot cross-sectional area of laser light×pulse width). In the case of continuous waves, the intensity of laser light is determined by the field intensity (W/cm$^2$) of laser light at the converging point.

Figure 1:
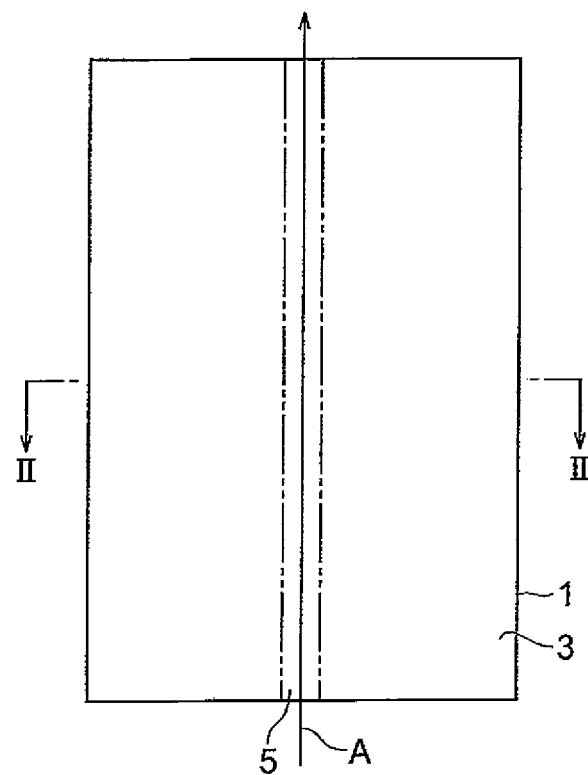
[FIG. 1] is a plan view of an object to be processed during laser processing by a laser processing apparatus in accordance with an embodiment.
Figure 2:
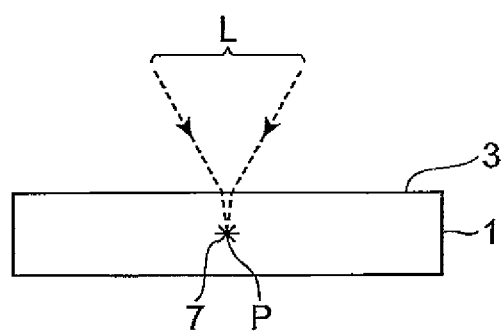
[FIG. 2] is a sectional view of the object taken along the line II-II of FIG. 1.

The principle of the laser processing method in accordance with the embodiment using such multiphoton absorption will be explained with reference to FIGS. 1 to 6. As illustrated in FIG. 1, on a front face 3 of a wafer-like (planar) object to be processed 1, a line to cut 5 for cutting the object 1 exists. The line to cut 5 is a virtual line extending straight. As illustrated in FIG. 2, the laser processing method in accordance with this embodiment irradiates the object 1 with laser light L while locating a converging point P therewithin under a condition generating multiphoton absorption so as to form a modified region 7. The converging point P is a position at which the laser light L is converged. The line to cut 5 may be curved instead of being straight, and may be a line actually drawn on the object 1 without being restricted to the virtual line.

Figure 3:
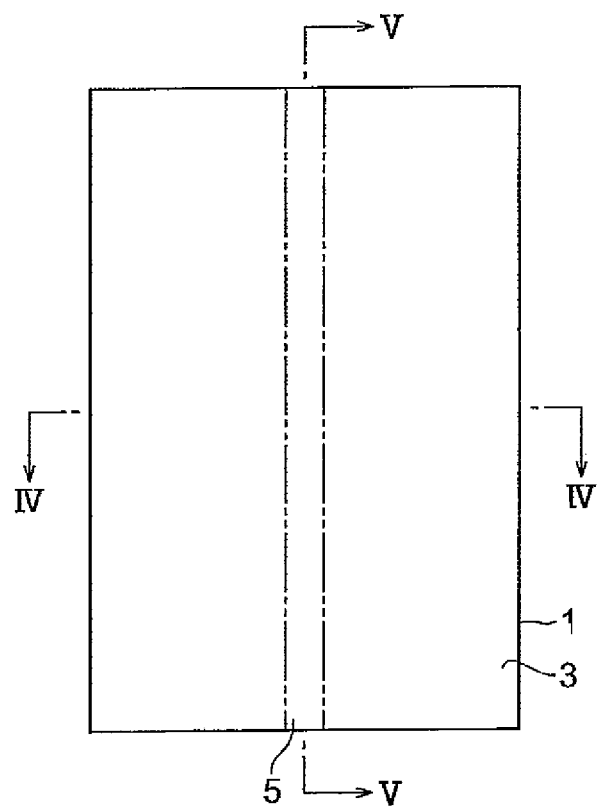
[FIG. 3] is a plan view of the object after laser processing by the laser processing apparatus in accordance with the embodiment.
Figure 4:
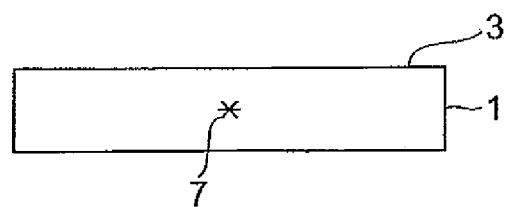
[FIG. 4] is a sectional view of the object taken along the line IV-IV of FIG. 3.
Figure 5:
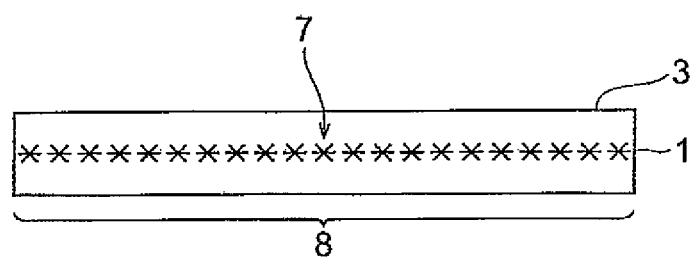
[FIG. 5] is a sectional view of the object taken along the line V-V of FIG. 3.

Then, the laser light L is relatively moved along the line to cut 5 (i.e., in the direction of arrow A in FIG. 1), so as to shift the converging point P along the line to cut 5. Consequently, as illustrated in FIGS. 3 to 5, the modified region 7 is formed along the line to cut 5 within the object 1, and becomes a cutting start region 8. The cutting start region 8 refers to a region which becomes a start point for cutting (fracturing) when the object 1 is cut. The cutting start region 8 may be made by forming the modified region 7 either continuously or intermittently.

In the laser processing method in accordance with this embodiment the front face 3 of the object 1 hardly absorbs the laser light L and thus does not melt.

Figure 6:
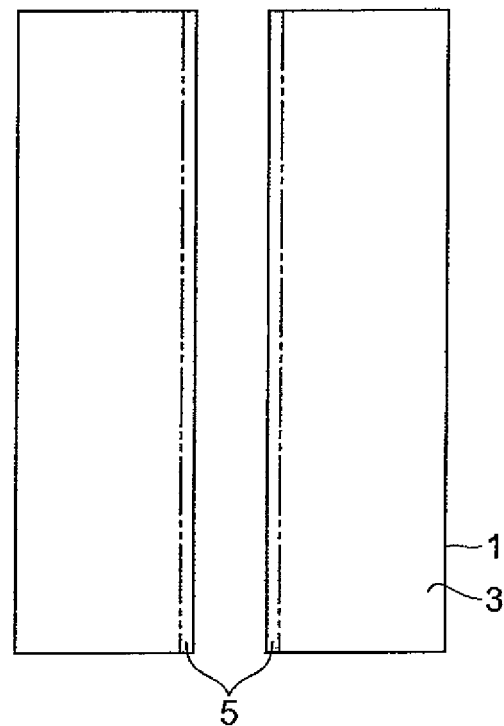
[FIG. 6] is a plan view of the object cut by the laser processing apparatus in accordance with the embodiment.

Forming the cutting start region 8 within the object 1 makes it easier to generate fractures from the cutting start region 8 acting as a start point whereby the object 1 can be cut with a relatively small force as illustrated in FIG. 6. Therefore, the object 1 can be cut with a high precision without generating unnecessary fractures on the front face 3 of the object 1.

There seem to be the following two ways of cutting the object 1 from the cutting start region 8 acting as a start point. One is where an artificial force is applied to the object 1 after the cutting start region 8 is formed, so that the object 1 fractures from the cutting start region 8 acting as a start point whereby the object 1 is cut. This is the cutting in the case where the object 1 has a large thickness, for example. Applying an artificial force refers to exerting a bending stress or shear stress to the object 1 along the cutting start region 8, or generating a thermal stress by applying a temperature difference to the object 1, for example. The other is where the forming of the cutting stat region 8 causes the object 1 to fracture naturally in its cross-sectional direction (thickness direction) from the cutting start region 8 acting as a start point, thereby cutting the object 1. This becomes possible if the cutting start region 8 is formed by one row of the modified region 7 when the object 1 has a small thickness, or if the cutting start region 8 is formed by a plurality of rows of the modified region 7 in the thickness direction when the object 1 has a large thickness. Even in this naturally fracturing case, fractures do not extend onto the front face 3 at a portion corresponding to an area not formed with the cutting start region 8 in the part to cut, so that only the portion corresponding to the area formed with the cutting stat region 8 can be cleaved, whereby cleavage can be controlled well. Such a cleaving method with a favorable controllability is very effective, since the object 1 to be processed such as a silicon wafer has recently been apt to decrease its thickness.

The modified region formed by multiphoton absorption in the laser processing method in accordance with this embodiment encompasses the following cases (1) to (3):

(1) Case Where the Modified Region is a Crack Region Including One or a Plurality of Cracks An object to be processed (e.g., glass or a piezoelectric material made of $LiTaO_3$) is irradiated with laser light while locating a converging point therewithin under a condition with a field intensity of at least $1\times10^8$ (W/cm$^2$) at the converging point and a pulse width of 1 μs or less. This magnitude of pulse width is a condition under which a crack region can be formed only within the object while generating multiphoton absorption without causing unnecessary damages to the front face of the object. This generates a phenomenon of optical damage by multiphoton absorption within the object. This optical damage induces a thermal distortion within the object, thereby forming a crack region therewith. The upper limit of field intensity is $1\times10^{12}$ (W/cm$^2$), for example. The pulse width is preferably 1 ns to 200 ns, for example. The forming of a crack region by multiphoton absorption is disclosed, for example, in "Internal Marking of Glass Substrate with Solid-state Laser", Proceedings of the 45th Laser Materials Processing Conference (December, 1998), pp. 23-28.

The inventors determined the relationship between field intensity and crack size by an experiment. The following are conditions of the experiment.

(A) Object to be processed: Pyrex (registered trademark) glass (with a thickness of 700 μm)

(B) Laser

Light source: semiconductor laser pumping Nd:YAG laser

Wavelength: 1064 nm

Laser light spot cross-sectional area: $3.14\times10^{-8}$ cm$^2$

Oscillation mode: Q-switched pulse

Repetition frequency: 100 kHz

Pulse width: 30 ns

Output:output<1 mJ/pulse

Laser light quality: $TEM_{00}$

Polarizing property: linear polarization (C) Converging Lens

Transmittance at a laser light wavelength: 60%

(D) Moving rate of the mount table mounting the object: 100 mm/sec

The laser light quality of $TEM_{00}$ means that the converging characteristic is so high that convergence to about the wavelength of laser light is possible.

Figure 7:
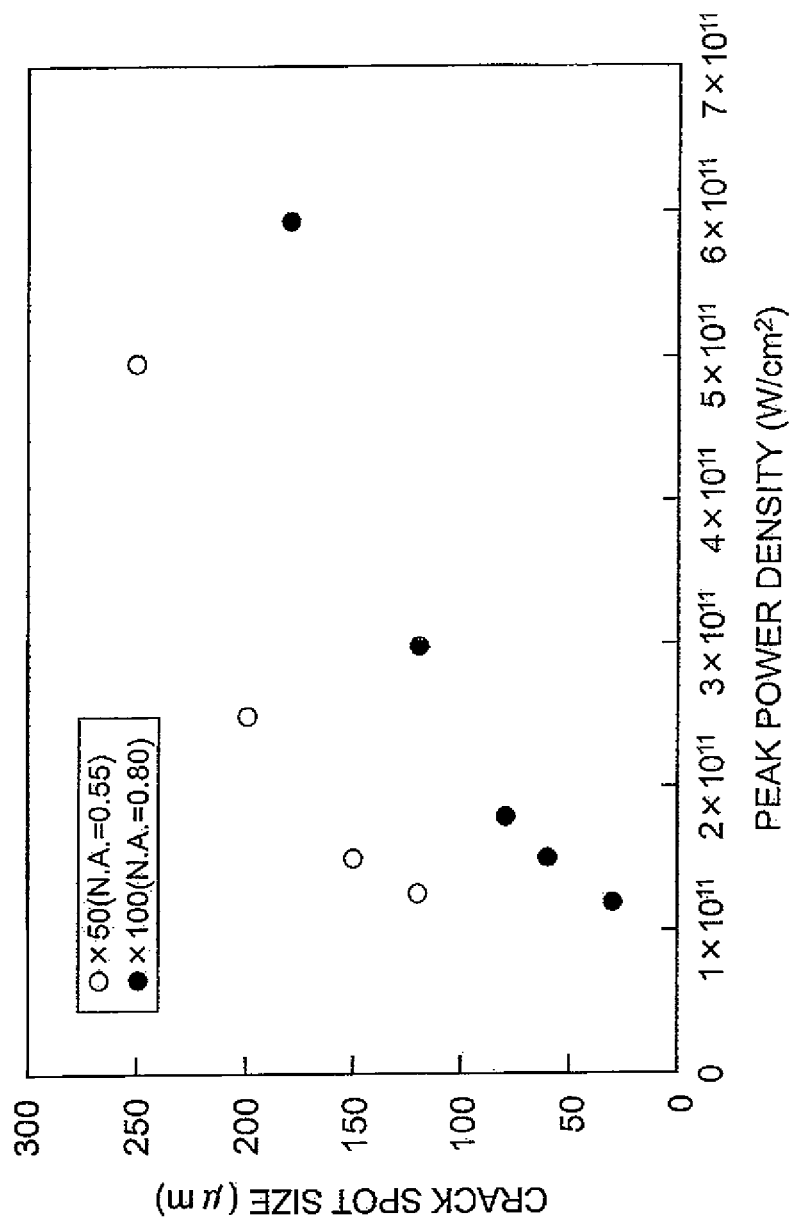
[FIG. 7] is a graph illustrating relationships between the field intensity and crack spot size in the laser processing apparatus in accordance with the embodiment.

FIG. 7 is a graph illustrating the results of the abovementioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack spot size is the size of a part yielding the maximum length among forms of crack spots. Data represented by black circles in the graph refer to a case where the converging lens (C) has a magnification of ×100 and a numerical aperture (NA) of 0.80. On the other hand, data represented by whitened circles in the graph refer to a case where the converging lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
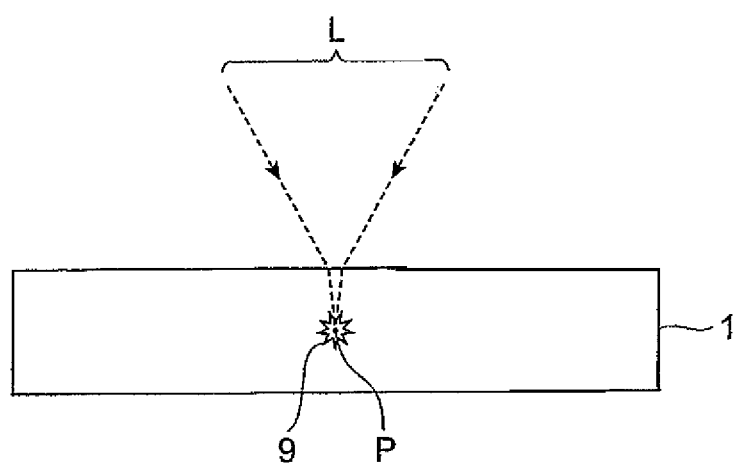
[FIG. 8] is a sectional view of the object in a first step of the laser processing apparatus in accordance with the embodiment.
Figure 9:
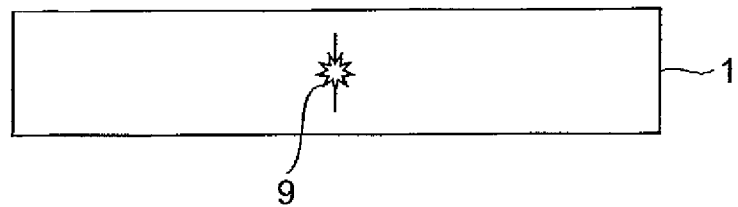
[FIG. 9] is a sectional view of the object in a second step of the laser processing apparatus in accordance with the embodiment.
Figure 10:
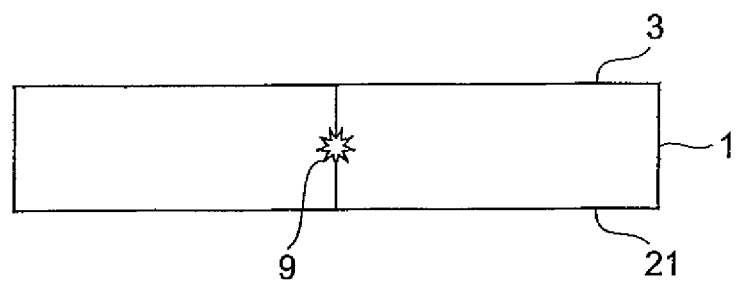
[FIG. 10] is a section view of the object in a third step of the laser processing apparatus in accordance with the embodiment.
Figure 11:
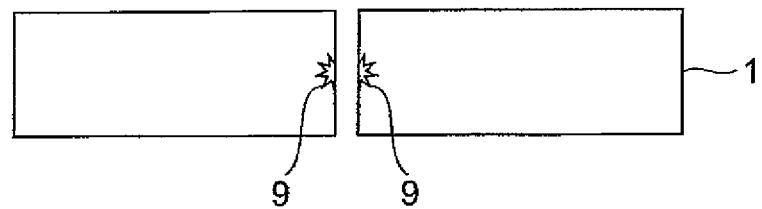
[FIG. 11] is a sectional view of the object in a fourth step of the laser processing apparatus in accordance with the embodiment.

A mechanism by which the object to be processed is cut by forming a crack region will now be explained with reference to FIGS. 8 to 11. As illustrated in FIG. 8, the object 1 is irradiated with laser light L while the converging point P is located within the object 1 under a condition where multiphoton absorption occurs so as to form a crack region 9 therewithin along a line to cut. The crack region 9 is a region containing one or a plurality of cracks. Thus formed crack region 9 becomes a cutting start region. A crack further grows from the crack region 9 acting as a start point (i.e., from the cutting start region acting as a start point) as illustrated in FIG. 9, and reaches the front face 3 and rear face 21 of the object 1 as illustrated in FIG. 10, whereby the object 1 fractures and is consequently cut as illustrated in FIG. 11. The crack reaching the front face 3 and rear face 21 of the object 1 may grow naturally or as a force is applied to the object 1.

(2) Case Where the Modified Region is a Molten Processed Region

An object to be processed (e.g., semiconductor material such as silicon) is irradiated with laser light while locating a converging point within the object under a condition with a field intensity of at least $1\times10^8$ (W/cm$^2$) at the converging point and a pulse width of 1 μs or less. As a consequence, the inside of the object is locally heated by multiphoton absorption. This heating forms a molten processed region within the object. The molten processed region encomnpasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure has changed to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monoctystal structure, the molten processed region is an amorphous silicon structure, for example. The upper limit of field intensity is $1\times10^{12}$ S/cm$^2$), for example. The pulse width is preferably 1 ns to 200 ns, for example.

By an experiment, the inventors verified that a molten processed region was formed within a silicon wafer (semiconductor substrate). The following are conditions of the experiment.

(A) Object to be processed: silicon wafer (with a thickness of 350 μm and an outer diameter of 4 inches)

(B) Laser

Light source: semiconductor laser pumping Nd:YAG laser

Wavelength: 1064 nm

Laser light spot cross-sectional area: $3.14\times10^{-8}$ cm$^2$

Oscillation mode: Q-switched pulse

Repetition frequency: 100 kHz

Pulse width: 30 ns

Output: 20 μJ/pulse

Laser light quality: $TEM_{00}$

Figure 12:
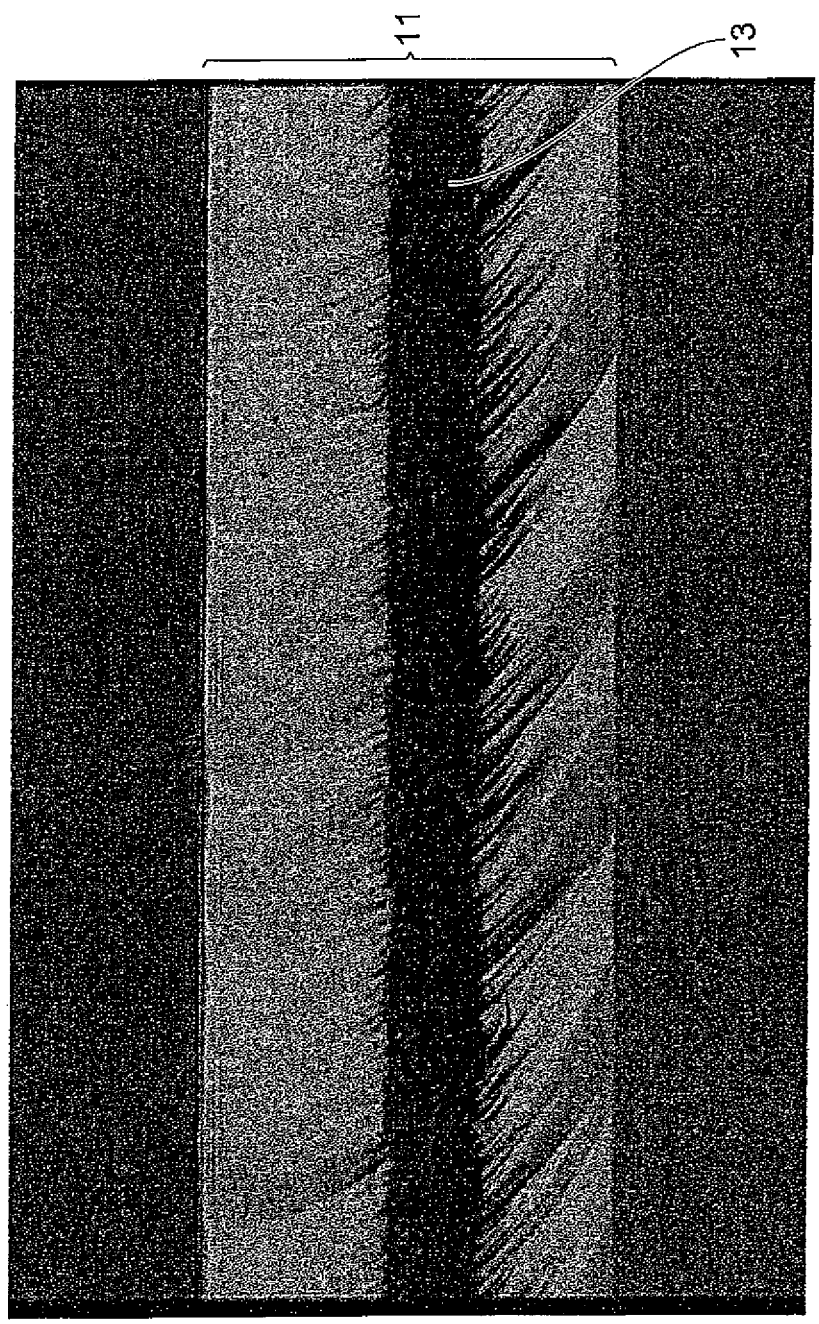
[FIG. 12] is a view illustrating a photograph of a cut section in a part of a silicon wafer cut by the laser processing apparatus in accordance with the embodiment.

Polarizing property: linear polarization
(C) Converging lens
Magnification: ×50
N.A.: 0.55
Transmittance at a laser light wavelength: 60%
(D) Moving rate of the mount table mounting the object: 100 mm/sec FIG. 12 is a view illustrating a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 μm in the thickness direction.

Figure 13:
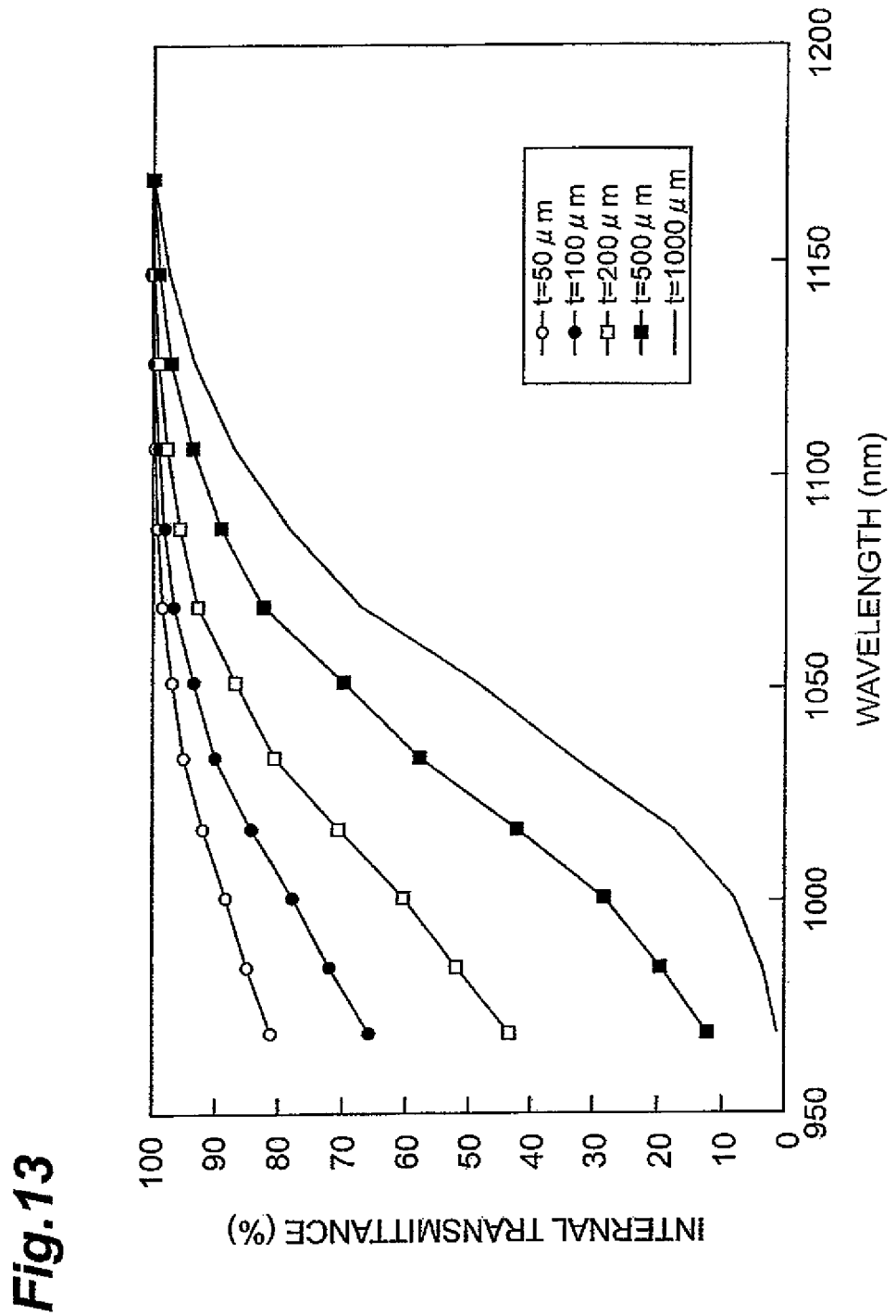
[FIG. 13] is a graph illustrating relationships between the laser light wavelength and the transmittance within a silicon substrate in the laser processing apparatus in accordance with the embodiment

The fact that the molten processed region 13 is formed by multiphoton absorption will now be explained. FIG. 13 is a graph illustrating relationships between the laser light wavelength and the transmittance within the silicon substrate. Here, the respective reflected components on the front and rear sides of the silicon substrate are eliminated, so as to represent the internal transmittance alone. The respective relationships are illustrated in the cases where the thickness t of the silicon substrate is 50 μm, 100 μm, 200 μm, 500 μm, and 1000 μm.

For example, at the Nd:YAG laser wavelength of 1064 nm, the laser light appears to be transmitted through the silicon substrate by at least 80% when the silicon substrate has a thickness of 500 μm or less. Since the silicon wafer 11 illustrated in FIG. 12 has a thickness of 350 μm, the molten processed region 13 caused by multiphoton absorption is formed near the center of the silicon wafer 11, i.e., at a part distanced from the front face by 175 μm. The transmittance in this case is 90% or more with reference to a silicon wafer having a thickness of 200 μm, whereby the laser light is absorbed only slightly within the silicon wafer 11 but is substantially transmitted therethrough. This means that the molten processed region 13 is formed within the silicon wafer 11 not by the absorption of laser light within the silicon wafer 11 (i.e., not by usual heating with the laser light) but by multiphoton absorption. The forming of a molten processed region by multiphoton absorption is disclosed, for example, in "Ultrashort Pulse Laser Microprocessing of Silicon", Preprints of the National Meetings of Japan Welding Society, Vol. 66 (April, 2000), pp. 72-73.

A fracture is generated in a silicon wafer from a cutting start region formed by a molten processed region, acting as a start point, in a cross-sectional direction, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the cutting start region to the front and rear faces of the silicon wafer encompasses a case where the fracture grows from a state in which the molten processed region forming the cutting start region is molten and a case where the fracture grows when the molten processed region forming the cutting start region is re-solidified from the molten state. In either case, the molten processed region is formed only within the silicon wafer, and thus is present only within the cut section after cutting as illustrated in FIG. 12. When a cutting start region is thus formed within the object by a molten processed region, unnecessary fractures deviating from a cutting start region line are harder to occur at the time of cleaving, whereby cleavage control becomes easier. Here, the molten processed region may be formed not only by multiphoton absorption but also by other absorption actions.

(3) Case Where the Modified Region is a Refractive Index Change Region

An object to be processed (e.g., glass) is irradiated with laser light while locating a converging point within the object under a condition with a field intensity of at least $1 \times 10^8$ (W/cm$^2$) at the converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1 \times 10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November, 1997), pp. 105-111.

Though the cases (1) to (3) are explained in the foregoing as a modified region formed by multiphoton absorption, a cutting start region may be formed as follows while tog account of the crystal structure of a wafer-like object to be processed, its cleavage characteristic, and the like, whereby the object can be cut with a favorable precision by a smaller force from the cutting start region acting as a start point.

That is, in the case of a substrate made of a monocrystal semiconductor having a diamond structure such as silicon, it will be preferred if a cutting start region is formed in a direction extending along a (111) plane (first cleavage plane) or a (110) plane (second cleavage plane). In the case of a substrate made of a group III-V compound semiconductor of sphalerite structure such as GaAs, it will be preferred if, a cutting start region is formed in a direction extending along a (110) plane. In the case of a substrate having a crystal structure of hexagonal system such as sapphire (Al$_2$O$_3$), it will be preferred if a cutting start region is formed in a direction extending along a (1120) plane (A plane) or a (1100) plane (M plane) while using a (0001) plane (C plane) as a principal plane.

When the substrate is formed with an orientation flat in a direction to be formed with the above-mentioned cutting start region (e.g., a direction extending along a (111) plane in a monocrystal silicon substrate) or a direction orthogonal to the former direction, the cutting start region extending in the direction to be formed with the cutting start region can be formed easily and accurately with reference to the orientation flat.

The preferred embodiment of the present invention will now be explained.

Figure 14:
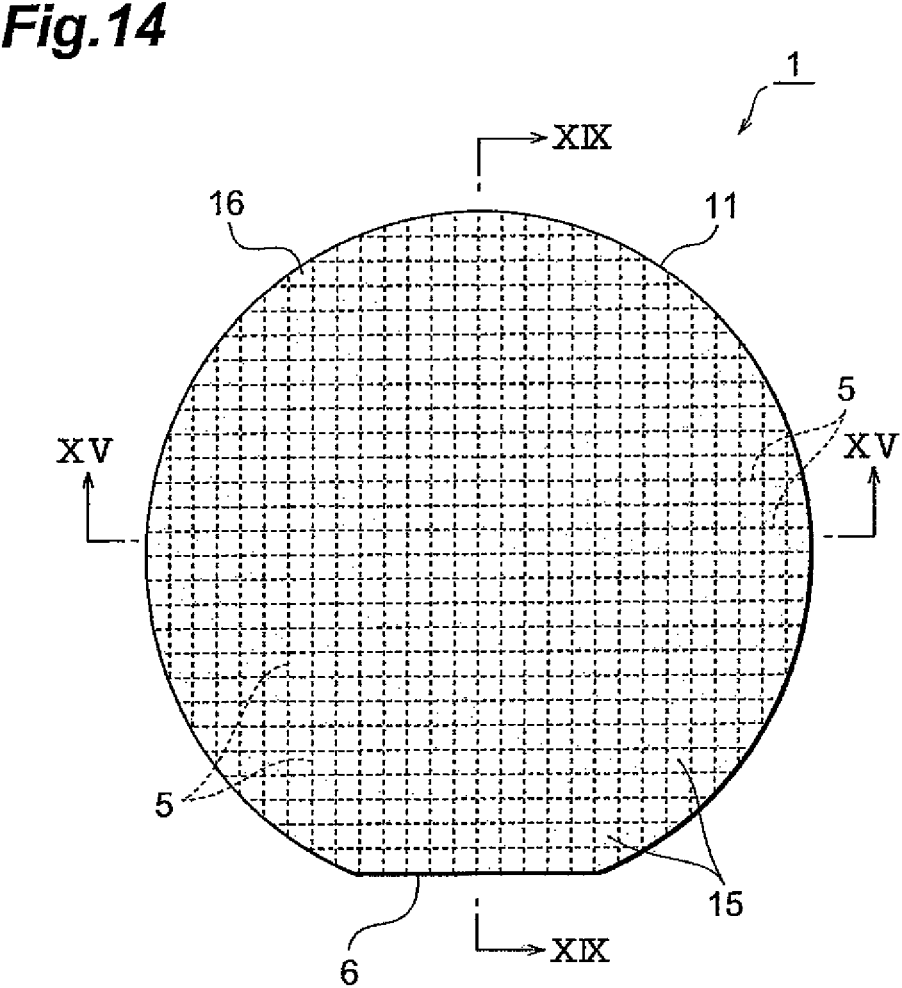
[FIG. 14] is a front view illustrating an object to be processed by the laser processing method in accordance with an embodiment of the present invention.
Figure 15:
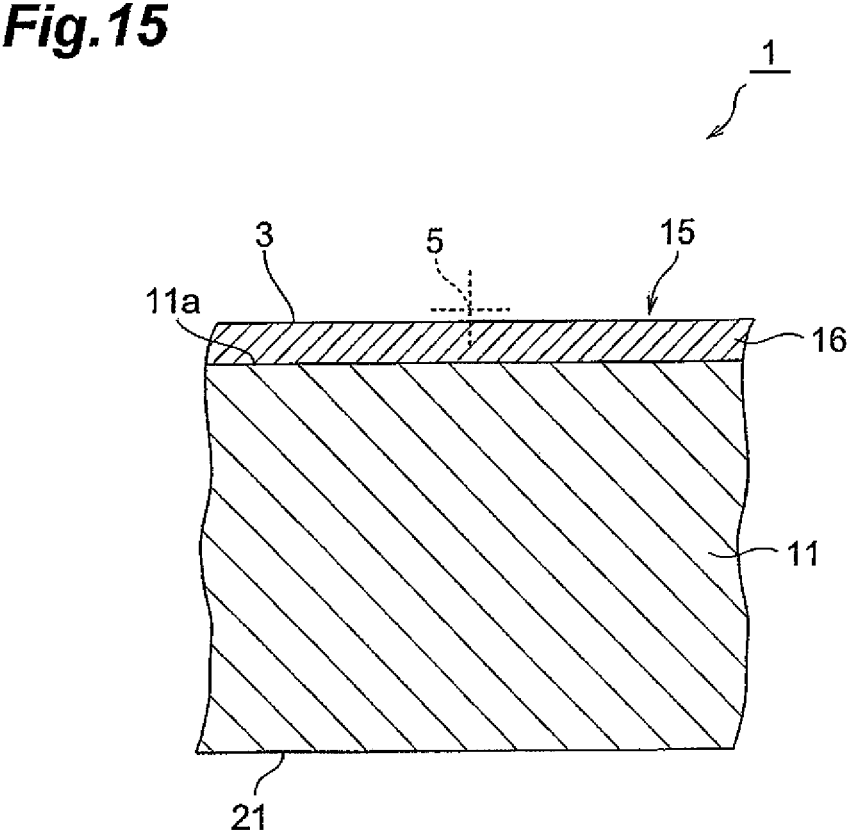
[FIG. 15] is a partial sectional view taken along the line X-X of FIG. 14.

As illustrated in FIGS. 14 and 15, an object to be processed 1 comprises a silicon wafer 11 and a functional device layer 16 which is formed on a front face 11a of the silicon wafer 11 while including a plurality of functional devices 15. The object 1 is a so-called MEMS (Micro Electro-Mechanical Systems) wafer, whose front face 3 has an oxide film (not depicted) formed thick thereon in order to improve etching resistance.

A number of functional devices 15, examples of which include mechanical constituent parts, sensors, actuators, and electronic circuit parts, are formed like a matrix in directions parallel and perpendicular to an orientation flat 6 of the silicon wafer 11. Such an object 1 is cut along lines to cut 5 set like grids passing between functional devices adjacent to each other, so as to yield a number of semiconductor chips.

An example of cutting the object 1 will now be explained. First, an expandable tape is attached to the rear face 21 of the object 1, and then the object 1 is mounted on a mount table. Subsequently, the object 1 is irradiated with processing laser light from the front face 3 side while locating a converging point will the silicon wafer 11, so as to form a modified region to become a cuffing start region within the object 1 along each line to cut 5. Then, the expandable tape is expanded, so that the object 1 is accurately cut into the functional devices 5 along the lines to cut 5, whereby a plurality of semiconductor chips are separated from each other. The modified region may include not only the molten processed region but also crack regions and the like.

Figure 19:
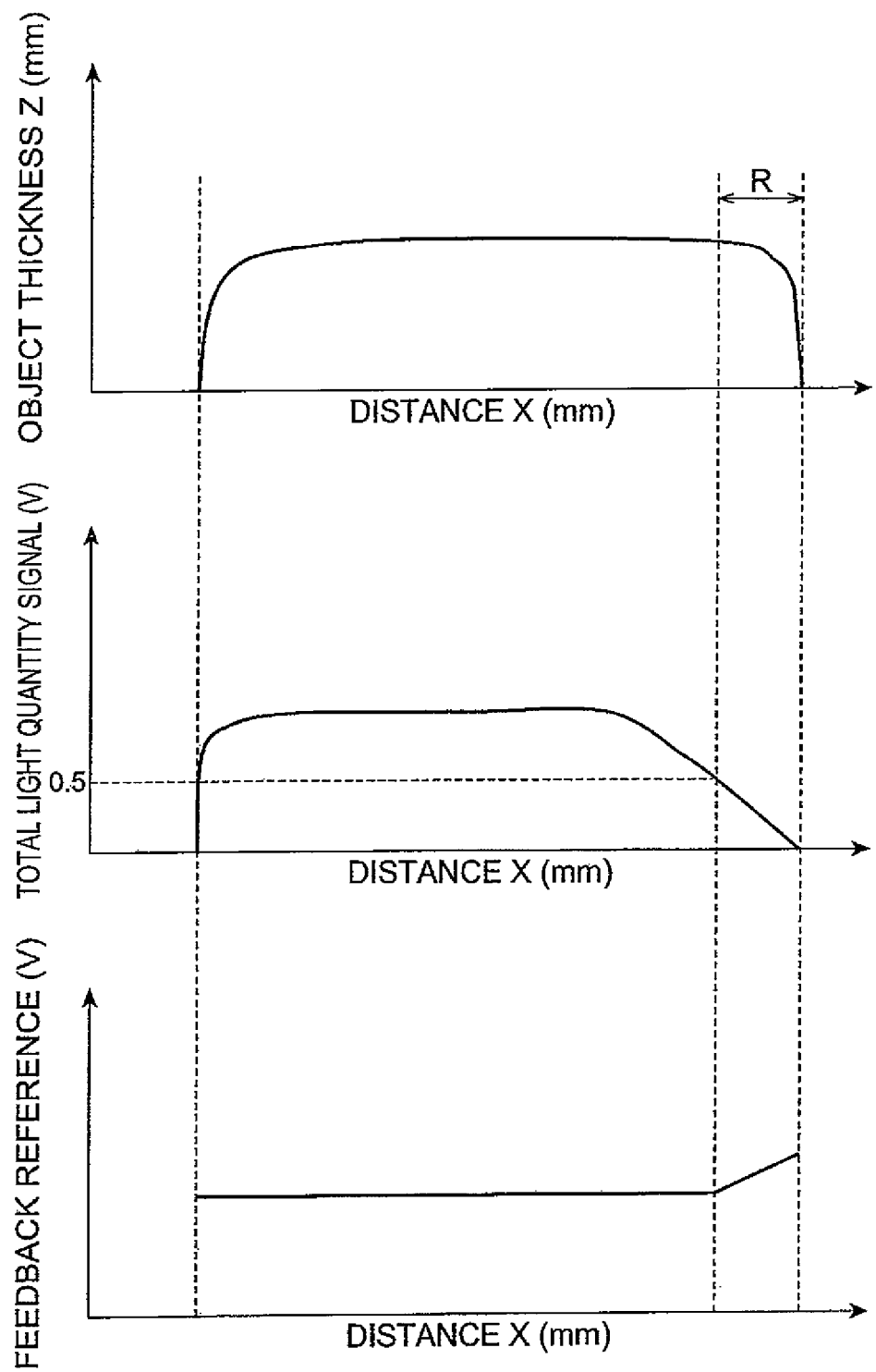
[FIG. 19] is a view taken along the line XIX-XIX of FIG. 14 for explaining trace recording in the laser processing method in accordance with an embodiment of the present invention.

The forming of the modified region mentioned above will now be explained in more detail. The following explanation will assume that, as illustrated in FIG. 19, the direction along a line to cut 5 in the object 1 is the X-axis (X-coordinate), the thickness direction of the object 1 is the Z-axis (Z-coordinate), the direction from the left end to right end of the object 1 is the positive direction on the X-axis, and the direction from the rear face 21 to the front face 3 is the positive direction on the Z-axis.

Setting Height

First, on the line to cut 5, the front face 3 is captured through a converging lens (lens) by a CCD camera, for example, and the mount table is relatively moved in the Z-direction such as to maximize the contrast of a projected reticle pattern. The Z-directional position of the front face 3 at this time is defied as an in-focus direction (where the displacement of the front face 3 is 0 μm).

Subsequently, measuring laser light is emitted through the converging lens, and its component reflected by the front face 3 is received by a quadrant photodiode, for example. The reflected light component is provided with astigmatism by a shaping optical system constituted by a cylindrical lens and a planoconvex lens, for example, and then is converged onto a light-receiving surface of the quadrant photodiode, so as to form a converged light image on the light-receiving surface. Therefore, the converged light image varies in response to the displacement of the front face 3 of the object 1 (the position of the converging point of the measuring laser light with respect to the front face 3). Hence, thus receiving the reflected light component with the quadrant photodiode acquires not only the displacement of the front face 3 as an astigmatism signal, but also a total light quantity signal (total light quantity value) corresponding to the total light quantity value of the reflected light component.

Next, a controller, for example, determines a displacement sensor signal from the astigmatism signal and total light quantity signal, and stores the displacement sensor signal as a feedback reference value V0 (−0.4 V here; first reference value). That is, the displacement sensor signal at the in-focus position is stored as a feedback reference value. Here, the feedback reference value V0 is determined at an X-coordinate where the total light quantity signal is 0.5 V or higher. This is for changing the feedback reference value in response to the total light quantity signal at X-coordinates where the total light quantity R signal value is less than 0.5 V (as will be explained later in detail). The displacement sensor signal, which is obtained by dividing the astigmatism signal by the total light quantity signal, is a relative value of the astigmatism signal with respect to the total light quantity received. Therefore, the displacement of the front face 3 can stably be detected when the amount of change in light quantity is relatively small.

Trace Recording

Next, while relatively moving the mount table at a speed of 300 mm/s, for example, along the line to cut 5, the measuring laser light is emitted, the displacement sensor signal is calculated as mentioned above, and the -directional position of the converging lens is controlled by a piezoelectric device, for example, such that the displacement sensor signal keeps the feedback reference value V0, i.e., the distance between the front face 3 and the converging lens is that at the in-focus position (tracing; S1 in FIG. 16). Here, the position is controlled by feedback control with a sampling period of 0.05 ms.

In general, a MEMS wafer such as the object 1 has a thick oxide film formed thereon as mentioned above, so that its thickness is likely to incur fluctuations, whereby an area exhibiting an extremely low reflectance to the measuring laser light easily occurs in a part of the front face 3. In the object 1, the reflectance is lower in the right end part along the line to cut 5, thereby exhibiting an extremely low total light quantity signal as illustrated in FIG. 19.

When the total light quantity signal is thus extremely low, the S/N ratio may become very worse, so that the astigmatism signal may contain a large amount of error components. Therefore, even when the displacement of the front face 3 of the object 1 is measured as a relative value (displacement sensor signal) of the total light quantity, error components may appear greatly in the displacement sensor signal. Hence, the displacement sensor signal in the case where the total light quantity signal is extremely low may differ from other displacement sensor signals even when the displacement of the front face 3 is the same.

Figure 17:
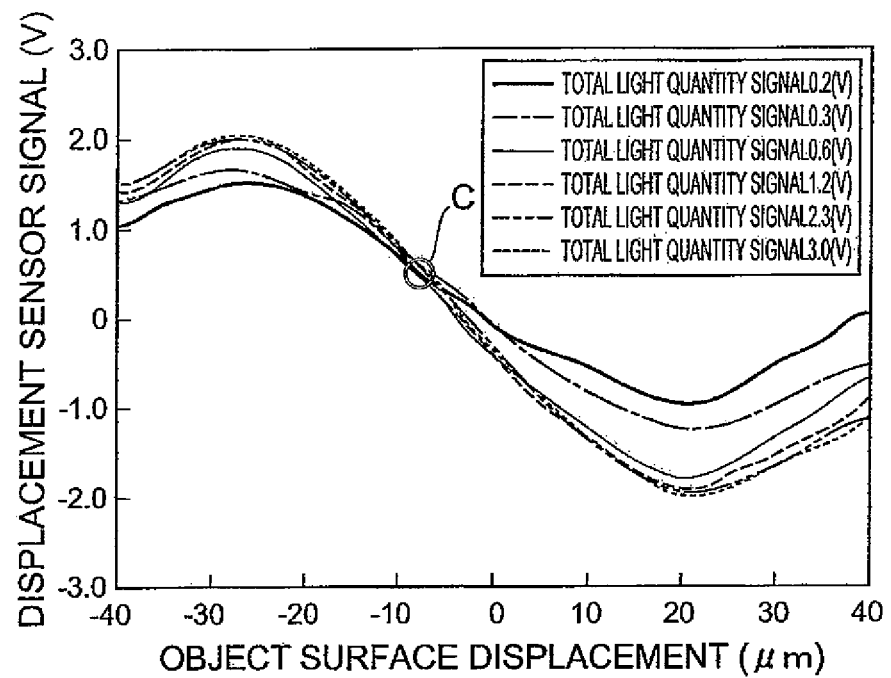
[FIG. 17] is a graph illustrating relationships between total light quantity signal and displacement sensor signal in the laser processing method in accordance with an embodiment of the present invention.

In particular, as illustrated in FIG. 17, his embodiment locates the converging point C of the measuring laser light not at the front face 3 but on the inner side of the object 1 than the front face 3 (such that the displacement of the front face 3 becomes negative; i.e., where the measuring laser light assumed to pass through the object 1 converges). This is because the converging point C located on the inner side of the object 1 than the front face 3 is more preferred in the following points, though the converging point C positioned at the front face 3 is preferred in general in that the converged light image on the light-receiving surface of the quadrant photodiode becomes circular so that the total light quantity signal is hard to differ if it changes.

That is, since the displacement of the front face 3 is acquired as an astigmatism signal according to a change in the converged light image of the reflected light component of the measuring laser light as mentioned above, the range where it is acquirable becomes a constant area symmetrical about the converged point of the measuring laser light, so that the range where the displacement sensor signal is acquirable in the above case totally moves toward the inside of the object 1, which makes it more preferred in that the modified region is easily formed at a deeper position (i.e., the modified region is easily formed in a thick object to be processed). Also, since locating the converging point of the measuring laser light on the inner side of the object 1 than the front face 3 increases the area of the converged light image at the front face 3, even when a number of cut marks and the like exist on the front face 3, for example, the part occupied by the cut marks in the converged light image becomes smaller, which makes it more preferred in being able to suppress the scattering of the reflected light component of the measuring laser light and acquire an accurate displacement sensor signal.

Therefore, the inventors conducted diligent studies concerning the relationship between the total light quantity signal and displacement sensor signal and, as a result, have found the following technical idea.

Figure 18:
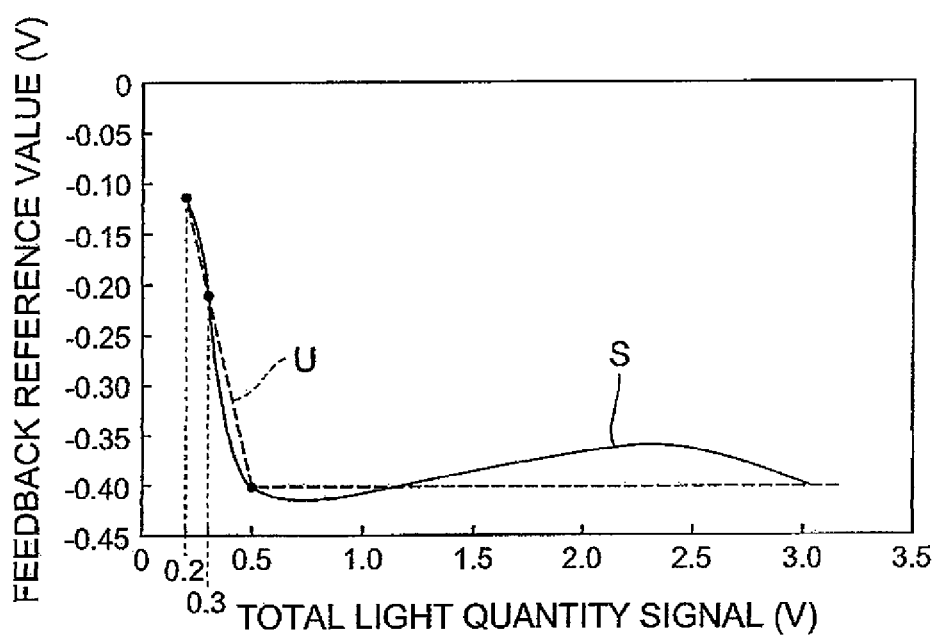
[FIG. 18] is a graph illustrating a relationship between total lights quantity signal and feedback reference value in the laser processing method in accordance with an embodiment of the present invention.

FIG. 18 is a graph illustrating the relationship between the total light quantity signal and feedback reference value on, a laser light irradiation surface having the same displacement. It is seen from the actually measured value S that the feedback reference value is a substantially constant value (−0.4 V here) in an area where the total light quantity signal is a predetermined value (0.5 V here) or higher. It is also seen that the feedback reference value varies in response to the total light quantity signal with a predetermined relationship thereto in an area where the total light quantity signal is lower than the predetermined value. Specifically, the displacement sensor signal is seen to increase as the total light quantity signal decreases even when the displacement of the front face 3 is the same at X-coordinates where the total light quantity signal is less than 0.5 V. In view of these, a technical idea of sequentially changing the feedback reference value in response to the total light quantity signal with a predetermined relationship thereto in an area where the total light quantity signal is lower than predetermined value has been found.

Figure 16:
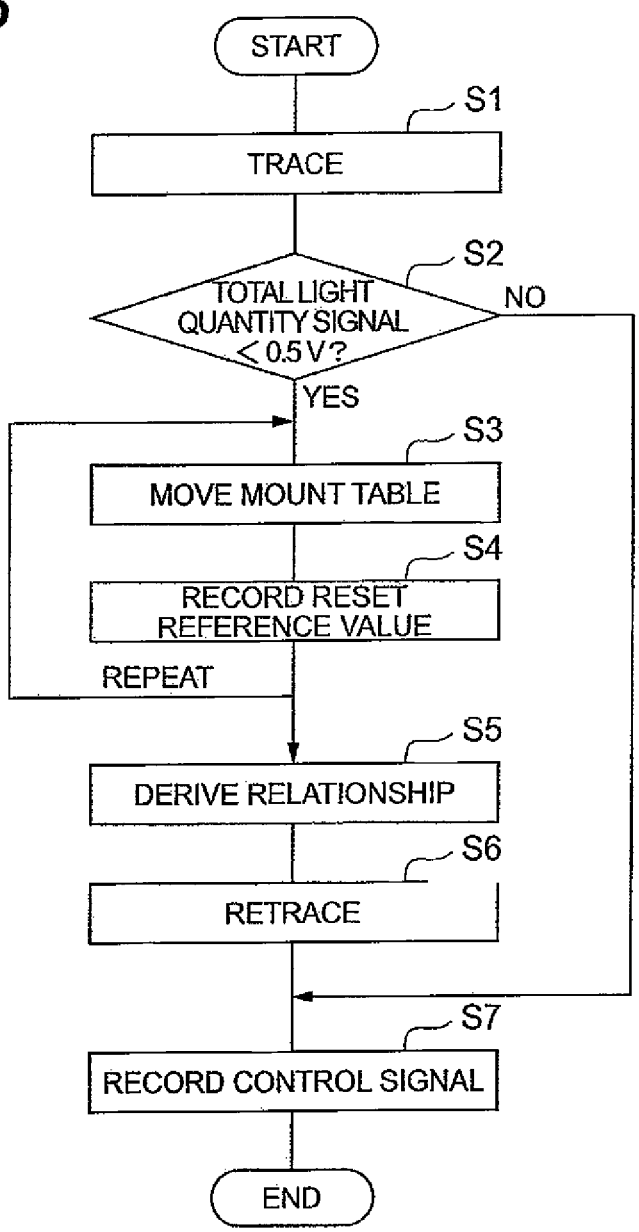
[FIG. 16] is a chart illustrating the flow of the laser processing method in accordance with an embodiment of the present invention.

Therefore this embodiment monitors the total light quantity signal at the time of tracing and determines whether the total light quantity signal of less than 0.5 V (threshold) is detected or not (S2 in FIG. 16). When the total light quantity signal of less than 0.5 V is not detected, the control signal is kept being recorded as it is (S2 to S7). That is, in this case, the object is irradiated with the measuring laser light along the line to cut 5; so as to calculate the displacement sensor signal, the Z-directional position of the converging lens is controlled such that the displacement sensor signal keeps the feedback reference value V0, and a control signal for this control (e.g., a driving signal for a piezoelectric device which drives the converging lens along its optical axis; first control value) is recorded.

On the other hand, the following operation (S2 to S3) is executed when the total light quantity signal of less than 0.5 V is detected. That is, after calculating the displacement sensor signal by tracing, the mount table is moved to an X-coordinate position where the total light quantity signal is less than 0.5 V. Then, height setting is performed again at this X-coordinate, so as to acquire the displacement sensor value and total light quantity value, and thus acquired values are recorded as a reset reference value (S4).

Subsequently, the moving and recording is repeatedly performed a plurality of times at different X-coordinate positions where the total light quantity signal is less than 0.5 V. Then, according to thus recorded plurality of reset reference values, a relationship between the feedback reference value and total light quantity signal in an area where the total light quantity is lower than the predetermined value is derived (S5). That is, a feedback reference value function U (see FIG. 18) in which the total light quantity signal is a variable is determined at X-coordinates where the total light quantity signal is less than 0.5 V (the area of arrow R in FIG. 19). Here, the height setting is performed at respective X-coordinates where the total light quantity signal is 0.5 V, 0.3 V, and 0.2 V, so as to determine their setting reference values, which are then subjected to a linear approximation, whereby the following expression (1) is determined as the function U:

$$\text{feedback reference value} = -1 \times \text{total light quantity signal} + 0.1 \quad (1)$$

where the total light quantity signal<0.5 [V].

Subsequently, tracing is performed again according to the above expression (1) (S6), and the control signal is recorded along the line to cut 5 (S7). Specifically, as illustrated in FIG. 19, feedback control is carried out with the feedback reference value V0 while recording the control signal for this control at X-coordinates where the total light quantity signal is 0.5 V or higher, whereas the feedback reference value is calculated in response to the total light quantity signal by the above expression (1) and the feedback control is carried out with thus calculated feedback reference value (second reference value) while recording the control signal (second control value) for this control at X-coordinates (the area of arrow R) where the total light quantity signal is less than 0.5 V.

Forming of Modified Region

Next, while reproducing the recorded control signals with the piezoelectric device and operating the converging lens, the object 1 is irradiated with processing laser light locating a converging point within the silicon wafer 11. This forms a modified region within the silicon wafer 11.

As explained in the foregoing, for the object 1 in which the quantity of the reflected light component of the measuring laser light extremely decreases in a part, this embodiment sets height in an area where the total light quantity signal is higher than 0.5 V, which corresponds to an area where error components do not appear greatly in the displacement sensor signal, and performs tracing while monitoring the total light quantity signal. Thereafter, when the monitored total light quantity signal is 0.5 V or higher, the trace recording is performed as it is. When the total light quantity signal of less than 0.5 V corresponding to an area where error components are likely to appear exists in the monitored total light quantity signal, on the other hand, the relationship between the feedback reference value and total light quantity signal is determined in the area where the total light quantity signal is less than 0.5 V, and the trace recording is redone according to this relationship.

Therefore, since the converging point of the processing laser light is located at a predetermined position from the front face 3 of the object 1 by making the displacement sensor signal become a predetermined value corresponding to the quantity of the reflected light component of the measuring laser light as mentioned above, this embodiment makes it possible for the converging point of the processing laser light to follow the front face 3 reliably and accurately even when an area exhibiting an extremely low reflectance to the measuring laser light exists in a part of the front face 3 and lowers the light quantity of the reflected light component of the measuring laser light, whereby the modified region can accurately be formed at a predetermined position with respect to the front face 3. Hence, even when the object has an oxide film formed thereon with fluctuations, the converging point of the processing laser light can stably follow the front face 3. This can prevent the modified region from reaching the front face 3, and the converging point of the processing laser light from approaching the front face 3 and damaging the functional devices 15.

Further, as mentioned above, this embodiment derives the above expression (1) beforehand, and positions the converging point of the processing laser light according to this relational expression. That is, the above-mentioned technical ideal, i.e., the technical idea of sequentially changing the feedback reference value in response to the total light quantity signal with a predetermined relationship in an area where the total light quantity signal is lower than a predetermined value, is optimally applied to the laser processing method, whereby the displacement sensor signal can easily and reliably attain a feedback reference value corresponding to the total light quantity signal.

Though a preferred embodiment of the present invention has been explained in the foregoing, the present invention is not limited to the above-mentioned embodiment.

For example, the above expression (1) may be determined by various approximation methods such as curve approximation and least squarest approximation without being restricted to the linear approximation in the above-mentioned embodiment.

Though the above-mentioned embodiment sets height at respective X-coordinates where the total light quantity signal is 0.5 V, 0.3 V, and 0.2 V at the time of trace recording, so as to derive the above expression (1), a relational expression between the total light quantity signal and feedback reference value may be used in common according to species of the object, its characteristics, and the like. This can favorably perform so-called real-time processing in which the modified region is formed at the same time when the displacement of the laser light Radiation surface is measured Though the above-mentioned embodiment determines the relationship between the feedback reference value and total light quantity signal in the area where the total light quantity signal is less than 0.5 V, and redoes the trace recording according to this relationship, the trace recording may be redone with the Z-directional position of the converging lens being fixed in the area where the total light quantity signal is less than 0.5 V, i.e., with a constant control signal value at X-coordinates where the total light quantity signal is less than 0.5 V. The real-dime processing can favorably be carried out when the control signal is thus kept at a constant value.

Not only the silicon wafer 11, but semiconductor compound materials such as gallium arsenide, piezoelectric materials, sapphire, and glass, for example, may also be used. In this embodiment, the laser light may be emitted under various conditions without being limited by pulse pitch width, output, and the like.

Industrial Applicability

The present invention makes it possible for a converging point of processing laser light to accurately follow a laser light irradiation surface of an object to be processed.

The invention claimed is:

1. A laser processing method of irradiating a planar object to be processed with processing laser light while locating a converging point within the planar object, so as to form a modified region to become a cutting start point within the planar object along a line to cut the planar object, the method comprising:
   a height setting step of irradiating the planar object with a measuring laser light, adding astigmatism to a reflected light component of the measuring laser light reflected by a laser irradiation surface irradiated with the measuring laser light in the planar object, detecting, as a feedback reference value, a displacement sensor signal corresponding to a converged light image of the reflected light component having the astigmatism added thereto, and locating the converging point of the measuring laser light within the object rather than at a front face of the object, so as to entirely move an acquirable range of the displacement sensor signal toward an inside of the planar object;
   a trace recording step of irradiating with the measuring laser light along the line to cut, adding astigmatism to a reflected light component of the measuring laser light reflected by a laser irradiation surface irradiated with the measuring laser light in the planar object, detecting a displacement sensor signal corresponding to a converged light image of the reflected light component having the astigmatism added thereto, and making the displacement sensor signal become the feedback reference value, so as to perform feedback control for locating the converging point of the processing laser light at a predetermined position with respect to the laser irradiation surface, and recording the control signal of the control; and
   a modified region forming step for controlling with the control signal, locating the converging point of the processing laser light at a predetermined position with respect to the laser irradiation surface and irradiates the planar object with the processing laser light, so as to form a modified region within the planar object,
   wherein the displacement sensor signal is a relative value of an astigmatism signal corresponding to displacement of the laser irradiation surface, relative to a total light quantity signal corresponding to a total light quantity of a reflected light component received.

2. A laser processing method according to claim 1, wherein the height setting step further comprises acquiring the feedback reference value beforehand in a state where a converging point of the measuring laser light is positioned at a predetermined distance from the laser light irradiation surface; and
   wherein the trace recording step further comprises making the displacement sensor signal become the predetermined value according to the feedback reference value, so as to locate the converging point of the processing laser light at the predetermined position with respect to the laser light irradiation surface.

3. A laser processing method according to claim 1, wherein the planar object has a semiconductor substrate, and wherein the modified region includes a molten processed region.

4. A laser processing method according to claim 1, further comprising the step of cutting the planar object along the line to cut from the modified region acting as a cutting start point.

5. A laser processing method according to claim 1, wherein a total light quantity value corresponding to a total quantity of the reflected light component is detected along the line to cut while detecting the displacement sensor signal;
   wherein, when the total light quantity value is a threshold value or higher, a lens for converging the laser light is moved along an optical axis thereof such that the displacement sensor signal becomes a predetermined first reference value, so as to acquire a first control value for controlling the movement of the lens;
   wherein, when the total light quaniity value is less than the threshold, the displacement sensor signal and the total light quantity value are detected again at a position where the total light quantity value of less than the threshold is detected, so as to acquire a relationship between the redetected displacement sensor signal and the total light quantity value;
   wherein the planar object is irradiated with the measuring laser light again along the line to cut, so as to detect the displacement sensor signal and the total light quantity value again; and
   wherein the lens is moved along the optical axis thereof such that the displacement sensor signal becomes the first reference value at a position where the total light quantity value of the threshold value or higher is detected, and the lens is moved along the optical axis thereof such that the displacement sensor signal becomes a second reference value calculated from the total light quantity value and the relationship so as to acquire a second control value for controlling the movement of the lens at a position where the total light quantity value of less than the threshold is detected.

6. A laser processing method according to claim 1, wherein the feedback reference value is sequentially altered in a predetermined correspondence according to the total light quantity signal in a region having the total light quantity signal lower than the predetermined value.

7. A laser processing method according to claim 1, wherein if the total light quantity signal equal to or exceeding the predetermined value is detected, the trace recording step irradiates with the measuring laser light along the line to cut, performs feedback control and records the control signal of the control.

8. A laser processing method according to claim 1, wherein, if the total light quantity signal less than the predetermined value is detected, the trace recording step irradiates with the measuring laser light along the line to cut, calculates the displacement sensor signal, then performs the height setting step at a position where the total light quantity signal in the planar object is less than the predetermined value, reacquires the displacement sensor signal and the total light quantity signal and records the displacement sensor signal and the total light quantity signal acquired as reset reference values.

9. A laser processing method according to claim 2, wherein a total light quantity value corresponding to a total quantity of the reflected light component is detected along the line to cut while detecting the displacement sensor signal;
   wherein, when the total light quantity value is a threshold value or higher, a lens for converging the laser light is moved along an optical axis thereof such that the displacement sensor signal becomes a predetermined first reference value, so as to acquire a first control value for controlling the movement of the lens;
   wherein, when the total light quantity value is less than the threshold, the displacement sensor signal and the total light quantity value are detected again at a position where the total light quantity value of less than the threshold is detected, so as to acquire a relationship between the redetected displacement sensor signal and the total light quantity value;
   wherein the planar object is irradiated with the measuring laser light again along the line to cut, so as to detect the displacement sensor signal and the total light quantity value again; and
   wherein the lens is moved along the optical axis thereof such that the displacement sensor signal becomes the first reference value at a position where the total light quantity value of the threshold value or higher is detected, and the lens is moved along the optical axis thereof such that the displacement sensor signal becomes a second reference value calculated from the total light quantity value and the relationship so as to acquire a second control value for controlling the movement of the lens at a position where the total light quantity value of less than the threshold is detected.

10. A laser processing method according to claim 3, wherein a total light quantity value corresponding to a total quantity of the reflected light component is detected along the line to cut while detecting the displacement sensor signal;
   wherein, when the total light quantity value is a threshold value or higher, a lens for converging the laser light is moved along an optical axis thereof such that the displacement sensor signal becomes a predetermined first reference value, so as to acquire a first control value for controlling the movement of the lens;
   wherein, when the total light quantity value is less than the threshold, the displacement sensor signal and the total light quantity value are detected again at a position where the total light quantity value of less than the threshold is detected, so as to acquire a relationship between the redetected displacement sensor signal and the total light quantity value;
   wherein the planar object is irradiated with the measuring laser light again along the line to cut, so as to detect the displacement sensor signal and the total light quantity value again; and
   wherein the lens is moved along the optical axis thereof such that the displacement sensor signal becomes the first reference value at a position where the total light quantity value of the threshold value or higher is detected, and the lens is moved along the optical axis thereof such that the displacement sensor signal becomes a second reference value calculated from the total light quantity value and the relationship so as to acquire a second control value for controlling the movement of the lens at a position where the total light quantity value of less than the threshold is detected.

11. A laser processing method according to claim 4, wherein a total light quantity value corresponding to a total quantity of the reflected light component is detected along the line to cut while detecting the displacement sensor signal;
   wherein, when the total light quantity value is a threshold value or higher, a lens for converging the laser light is moved along an optical axis thereof such that the displacement sensor signal becomes a predetermined first reference value, so as to acquire a first control value for controlling the movement of the lens;
   wherein, when the total light quantity value is less than the threshold, the displacement sensor signal and the total light quantity value are detected again at a position where the total light quantity value of less than the threshold is detected, so as to acquire a relationship between the redetected displacement sensor signal and the total light quantity value;
   wherein the planar object is irradiated with the measuring laser light again along the line to cut, so as to detect the displacement sensor signal and the total light quantity value again; and
   wherein the lens is moved along the optical axis thereof such that the displacement sensor signal becomes the first reference value at a position where the total light quantity value of the threshold value or higher is detected, and the lens is moved along the optical axis thereof such that the displacement sensor signal becomes a second reference value calculated from the total light quantity value and the relationship so as to acquire a second control value for controlling the movement of the lens at a position where the total light quantity value of less than the threshold is detected.

12. A laser processing method according to claim 5, wherein, while locating the converging point at the predetermined position with respect to the laser light irradiation surface by moving the lens according the first or second control value, the planar object is irradiated with the processing laser light.

13. A laser processing method according to claim 9, wherein, while locating the converging point at the predetermined position with respect to the laser light irradiation surface by moving the lens according the first or second control value, the planar object is irradiated with the processing laser light.

14. A laser processing method according to claim 10, wherein, while locating the converging point at the predetermined position with respect to the laser light irradiation surface by moving the lens according the first or second control value, the planar object is irradiated with the processing laser light.

15. A laser processing method according to claim 11, wherein, while locating the converging point at the predetermined position with respect to the laser light irradiation surface by moving the lens according the first or second control value, the planar object is irradiated with the processing laser light.

* * * * *